US010706101B2

(12) United States Patent
Breslow et al.

(10) Patent No.: US 10,706,101 B2
(45) Date of Patent: Jul. 7, 2020

(54) BUCKETIZED HASH TABLES WITH REMAP ENTRIES

(71) Applicant: Advanced Micro Devices, Inc., Sunnyvale, CA (US)

(72) Inventors: Alexander D. Breslow, Sunnyvale, CA (US); Dong Ping Zhang, San Jose, CA (US); Nuwan S. Jayasena, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 510 days.

(21) Appl. No.: 15/438,401

(22) Filed: Feb. 21, 2017

(65) Prior Publication Data

US 2017/0300592 A1    Oct. 19, 2017

Related U.S. Application Data

(60) Provisional application No. 62/322,494, filed on Apr. 14, 2016.

(51) Int. Cl.
*G06F 16/901* (2019.01)

(52) U.S. Cl.
CPC ................. *G06F 16/9014* (2019.01)

(58) Field of Classification Search
CPC .. G06F 16/9014; G06F 16/22; G06F 12/1018; G06F 12/0813; H04L 49/00
USPC .......... 707/747; 711/103, 108, 216
See application file for complete search history.

(56) References Cited

U.S. PATENT DOCUMENTS

| | | |
|---|---|---|
| 3,704,363 A | 11/1972 | Salmassy et al. |
| 4,969,164 A | 11/1990 | Mehta et al. |
| 5,046,068 A | 9/1991 | Kubo et al. |
| 5,257,215 A | 10/1993 | Poon |
| 5,339,266 A | 8/1994 | Hinds et al. |
| 5,386,375 A | 1/1995 | Smith |
| 5,515,308 A | 5/1996 | Karp et al. |
| 5,546,593 A | 8/1996 | Kimura et al. |
| 5,619,439 A | 4/1997 | Yu et al. |

(Continued)

OTHER PUBLICATIONS

Alverson et al., "Exploiting Heterogeneous Parallelism on a Multithreaded Multiprocessor", Proceedings of the 6th International Conference on Supercomputing, Aug. 1, 1992, pp. 188-197.

(Continued)

*Primary Examiner* — Dung K Chau
(74) *Attorney, Agent, or Firm* — Kowert Hood Munyon Rankin and Goetzel PC; Rory D. Rankin

(57) ABSTRACT

Methods and mechanisms for managing data in a hash table are disclosed. A computing system includes a hash table configured to store data and hash management logic. In response to receiving a request to insert data into the hash table, the hash management logic is configured to generate a first hash value by applying a first hash function to the key of the key-value pair, and identify a first bucket within the hash table that corresponds to the first hash table. If the first bucket has a slot available, store the key-value pair in the slot. If the first bucket does not have a slot available, select a first slot of the first bucket for conversion to a remap entry, store the key-value pair in a second bucket, and store information associating the key-value pair with the second bucket in the remap entry.

20 Claims, 9 Drawing Sheets

(56) References Cited

U.S. PATENT DOCUMENTS

| | | | |
|---|---|---|---|
| 5,745,902 | A | 4/1998 | Miller et al. |
| 5,768,592 | A | 6/1998 | Chang |
| 5,832,510 | A | 11/1998 | Ito et al. |
| 5,835,705 | A | 11/1998 | Larsen et al. |
| 5,950,003 | A | 9/1999 | Kaneshiro et al. |
| 5,954,789 | A | 9/1999 | Yu et al. |
| 6,018,759 | A | 1/2000 | Doing et al. |
| 6,052,708 | A | 4/2000 | Flynn et al. |
| 6,073,129 | A * | 6/2000 | Levine ............... G06F 12/0813 |
| 6,076,157 | A | 6/2000 | Borkenhagen et al. |
| 6,088,788 | A | 7/2000 | Borkenhagen et al. |
| 6,088,800 | A | 7/2000 | Jones et al. |
| 6,105,127 | A | 8/2000 | Kimura et al. |
| 6,131,104 | A | 10/2000 | Oberman |
| 6,212,544 | B1 | 4/2001 | Borkenhagen et al. |
| 6,249,906 | B1 | 6/2001 | Levine et al. |
| 6,282,554 | B1 | 8/2001 | Abdallah et al. |
| 6,341,347 | B1 | 1/2002 | Joy et al. |
| 6,349,319 | B1 | 2/2002 | Shankar et al. |
| 6,357,016 | B1 | 3/2002 | Rodgers et al. |
| 6,397,239 | B2 | 5/2002 | Oberman et al. |
| 6,415,308 | B1 | 7/2002 | Dhablania et al. |
| 6,427,196 | B1 | 7/2002 | Adiletta et al. |
| 6,434,699 | B1 | 8/2002 | Jones et al. |
| 6,496,925 | B1 | 12/2002 | Rodgers et al. |
| 6,507,862 | B1 | 1/2003 | Joy et al. |
| 6,523,050 | B1 | 2/2003 | Dhablania et al. |
| 6,553,564 | B1 | 4/2003 | Alexander et al. |
| 6,564,328 | B1 | 5/2003 | Grochowski et al. |
| 6,567,839 | B1 | 5/2003 | Borkenhagen et al. |
| 6,594,681 | B1 | 7/2003 | Prabhu |
| 6,625,654 | B1 | 9/2003 | Wolrich et al. |
| 6,629,236 | B1 | 9/2003 | Aipperspach et al. |
| 6,629,237 | B2 | 9/2003 | Wolrich et al. |
| 6,651,243 | B1 | 11/2003 | Berry et al. |
| 6,658,652 | B1 | 12/2003 | Alexander et al. |
| 6,668,308 | B2 | 12/2003 | Barroso et al. |
| 6,668,317 | B1 | 12/2003 | Bernstein et al. |
| 6,671,827 | B2 | 12/2003 | Guilford et al. |
| 6,681,345 | B1 | 1/2004 | Storino et al. |
| 6,687,838 | B2 | 2/2004 | Orenstien et al. |
| 6,694,347 | B2 | 2/2004 | Joy et al. |
| 6,694,425 | B1 | 2/2004 | Eickemeyer |
| 6,697,935 | B1 | 2/2004 | Borkenhagen et al. |
| 6,701,515 | B1 | 3/2004 | Wilson et al. |
| 6,728,845 | B2 | 4/2004 | Adiletta et al. |
| 6,728,955 | B1 | 4/2004 | Berry et al. |
| 6,748,556 | B1 | 6/2004 | Storino et al. |
| 6,801,997 | B2 | 10/2004 | Joy et al. |
| 6,820,107 | B1 | 11/2004 | Kawai et al. |
| 6,847,985 | B1 | 1/2005 | Gupta et al. |
| 6,857,064 | B2 | 2/2005 | Smith et al. |
| 6,883,107 | B2 | 4/2005 | Rodgers et al. |
| 6,889,319 | B1 | 5/2005 | Rodgers et al. |
| 6,898,694 | B2 | 5/2005 | Kottapalli et al. |
| 7,581,175 | B1 | 8/2009 | Skwirblies |
| 8,024,719 | B2 | 9/2011 | Gorton, Jr. |
| 2003/0066055 | A1 | 4/2003 | Spivey |
| 2005/0050223 | A1 | 3/2005 | Roeder et al. |
| 2006/0212243 | A1 | 9/2006 | Levine et al. |
| 2006/0242636 | A1 | 10/2006 | Chilimbi et al. |
| 2007/0150696 | A1 | 6/2007 | Hack |
| 2007/0288908 | A1 | 12/2007 | Cain et al. |
| 2008/0229056 | A1* | 9/2008 | Agarwal ............ G06F 16/9014 711/216 |
| 2012/0143877 | A1* | 6/2012 | Kumar ............... G06F 16/9014 707/747 |
| 2012/0221774 | A1* | 8/2012 | Atkisson ............ G06F 12/0802 711/103 |
| 2013/0086303 | A1* | 4/2013 | Ludwig .................. G06F 21/00 711/103 |
| 2013/0227195 | A1* | 8/2013 | Beaverson .......... G06F 12/1018 711/103 |
| 2013/0275656 | A1* | 10/2013 | Talagala .............. G06F 12/0246 711/103 |
| 2014/0122791 | A1* | 5/2014 | Fingerhut .............. H04L 49/00 711/108 |
| 2015/0039627 | A1* | 2/2015 | Sen ..................... G06F 16/2255 707/747 |
| 2015/0199138 | A1* | 7/2015 | Ramachandran ..... G06F 12/122 711/103 |

OTHER PUBLICATIONS

Alverson et al., "Tera Hardware-Software Cooperation", Proceedings of the 1997 ACM/IEEE Conference on Supercomputing, Nov. 1997, 16 pages.

Alverson et al., "The Tera Computer System", Proceedings of the 4th International Conference on Supercomputing, Jun. 1990, 6 pages.

Anderson et al., "Continuous Profiling: Where Have All the Cycles Gone?", ACM Transactions on Computer Systems (TOCS), Nov. 1, 2007, pp. 357-390, vol. 15, Issue 4.

Ball et al., "Efficient Path Profiling", Proceedings of the 29th Annual ACM/IEEE International Symposium on Microarchitecture, Dec. 2, 1996, pp. 46-57.

Baniasadi et al., "Instruction Flow-Based Front-end Throttling for Power-Aware High-Performance Processors", Proceedings of the 2001 International Symposium on Low Power Electronics and Design, Aug. 2001, pp. 16-21.

Breslow et al., "Horton Tables: Fast Hash Tables for In-Memory Data-Intensive Computing", Proceedings of the 2016 USENIX Annual Technical Conference, Jun. 22-24, 2016, pp. 281-294, https://www.usenix.org/system/files/conference/atc16/atc16_paper-breslow.pdf. [Retrieved Mar. 6, 2019].

Eberle et al., "A Cryptographic Processor for Arbitrary Elliptic Curves over GF(2m)", International Journal of Embedded Systems, Jul. 2003, pp. 444-454.

Erlingsson et al., "A Cool and Practical Alternative to Traditional Hash Tables", Proceedings of the 7th Workshop on Distributed Data and Structures (WDAS'06), 2006, 6 pages, https://www.ru.is/faculty/ulfar/CuckooHash.pdf. [Retrieved Mar. 6, 2019].

Fan et al., "Cuckoo Filter: Practically Better Than Bloom", Proceedings of the 10th ACM International on Conference on Emerging Networking Experiments and Technologies, Dec. 2, 2014, pp. 75-88, https://www.cs.cmu.edu/~dga/papers/cuckoo-conext2014.pdf. [Retrieved Mar. 6, 2019].

Fan et al., "MemC3: Compact and Concurrent MemCache with Dumber Caching and Smarter Hashing", Proceedings of the 10th USENIX Conference on Networked Systems Design and Implementation, Apr. 2, 2013, pp. 371-384, https://www.cs.cmu.edu/~dga/papers/memc3-nsdi2013.pdf. [Retrieved Mar. 6, 2019].

Graham et al., "gprof: a Call Graph Execution Profiler", Proceedings of the 1982 SIGPLAN Symposium on Compiler Construction, Jun. 23, 1982, pp. 120-126.

Gura et al., "An End-to-End Systems Approach to Elliptic Curve Cryptography", International Workshop on Cryptographic Hardware and Embedded Systems, Aug. 2002, pp. 349-365.

Ide et al., "A 320-MFLOPS CMOS Floating-Point Processing Unit for Superscalar Processors", IEEE Journal of Solid-State Circuits, Mar. 1993, pp. 352-361.

Joshi et al., "Targeted Path Profiling: Lower Overhead Path Profiling for Staged Dynamic Optimization Systems", Proceedings of the International Symposium on Code Generation and Optimization: Feedback-Directed and Runtime Optimization; Mar. 20, 2004, 12 pages.

Khorasani et al., "Stadium Hashing: Scalable and Flexible Hashing on GPUs", Proceedings of the 2015 International Conference on Parallel Architecture and Compilation (PACT), Oct. 18, 2015, pp. 63-74, https://mehmet.belviranli.com/papers/pact15.pdf. [Retrieved Mar. 6, 2019].

Kocberber et al. "Meet the Walkers: Accelerating Index Traversals for In-Memory Databases", Proceedings of the 46th Annual IEEE/ACM International Symposium on Microarchitecture (MICRO 2013),

(56) References Cited

OTHER PUBLICATIONS

Dec. 7, 2013, pp. 468-479, http://homepages.inf.ed.ac.uk/bgrot/pubs/WIDX_MICR013.pdf. [Retrieved Mar. 6, 2019].

Larson, Per-Ake, "Dynamic Hash Tables", Communications of the ACM, Apr. 1, 1988, pp. 446-457, vol. 31, No. 4.

Li et al., "Algorithmic Improvements for Fast Concurrent Cuckoo Hashing", Proceedings of the Ninth European Conference on Computer Systems, Apr. 13-16, 2014, 14 pages, https://www.cs.princeton.edu/~mfreed/docs/cuckoo-eurosys14.pdf. [Retrieved Jan. 31, 2019].

Moseley et al., "Checking Program Profiles", Proceedings of the Third IEEE International Workshop on Source Code Analysis and Manipulation (SCAM'03), Oct. 2003, 10 pages.

Nemawarkar et al., "Latency Tolerance: a Metric for Performance Analysis of Multithreaded Architectures", Proceedings of the 11th International Parallel Processing Symposium, Apr. 1997, pp. 227-232.

Seng et al., "Power-Sensitive Multithreaded Architecture", Proceedings of the 2000 IEEE International Conference on Computer Design: VLSI in Computers & Processors, Sep. 17, 2000, pp. 199-206.

Sherwood et al., "Discovering and Exploiting Program Phases", IEEE Micro, Nov. 1, 2001, pp. 84-93, vol. 23, Issue 6.

Sherwood et al., "Phase Tracking and Prediction", Proceedings of the 30th Annual International Symposium on Computer Architecture, Jun. 9, 2003, pp. 336-349.

Smith, Burton, "The End of Architecture", 17th Annual Symposium on Computer Architecture, May 29, 1990, pp. 10-17.

Tullsen et al., "Exploiting Choice: Instruction Fetch and Issue on an Implementable Simultaneous Multithreading Processor", May 15, 1996, pp. 191-202.

Tullsen et al., "Simultaneous Multithreading: Maximizing On-Chip Parallelism" Proceedings of the 22nd Annual International Symposium on Computer Architecture ISCA 1995, Jul. 1, 1995, pp. 533-544.

Uhrig et al., "Hardware-Based Power Management for Real-Time Applications", Proceedings of the Second International Symposium on Parallel and Distributed Computing, Oct. 2003, 8 pages.

Uhrig et al., "Implementing Real-Time Scheduling Within a Multithreaded Java Microcontroller", Dec. 2002, 8 pages.

Ungerer et al., "A Survey of Processors with Explicit Multithreading", ACM Computing Surveys, Mar. 2003, pp. 29-63, vol. 35, No. 1.

Zhang et al, "Whole Execution Traces", Proceedings of the 37th International Symposium on Microarchitecture (MICRO-37'04), Dec. 4, 2004, pp. 105-116.

Zhang et al., "Mega-KV: A Case for GPUs to Maximize the Throughput of In-Memory Key-Value Stores", Proceeding jf the VLDB Endowment, Jul. 1, 2015, pp. 1226-1237, vol. 8, No. 11, http://www.vldb.org/pvldb/vol8/p1226-zhang.pdf. [Retrieved Mar. 6, 2019].

\* cited by examiner

BUCKETIZED HASH TABLES WITH REMAP ENTRIES

CROSS REFERENCE TO RELATED APPLICATIONS

This application claims priority to Provisional Patent Application Ser. No. 62/322,494, entitled "Bucketized Hash Tables with Improved Memory Awareness", filed Apr. 14, 2016, the entirety of which is incorporated herein by reference.

BACKGROUND

Description of the Related Art

Computing systems are often tasked with managing data in a variety of ways, including identifying particular data elements, classifying data, searching for data, and so on. To this end, a wide variety of data structures are used to organize and manipulate data. For example, hash tables are often used in order to speed the location of particular data items. Typically, hash tables use a hash function to map a search key to an index that identifies a location (a "bucket" or "slot") within the hash table. Ideally, each key will map to only one bucket, though this is not always the case.

One type of hash table is a "bucketized cuckoo hash table." Generally speaking, a cuckoo hash table uses multiple hash functions so that each key may map to multiple alternative locations. While such hash tables may provide relatively good throughput on lookups, they may require searching more buckets, and hence hardware cache lines, than necessary.

For example, given a bucketized cuckoo hash table with k number of hash functions, positive lookups (where the key is in the table) examine (k+1)/2 buckets, and negative lookups (where the key is not in the table) examine k buckets. As different buckets typically map to different hardware cache lines, this corresponds to accessing (k+1)/2 cache lines on positive lookups and k cache lines on negative lookups. Even when k is 2, these costs correspond to 50% and 100% higher memory traffic than ideally should be necessary for positive and negative lookups, respectively, if every table lookup query could be satisfied by searching a single bucket.

Accordingly, improved methods and mechanism for managing data with bucketized tables are described herein.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
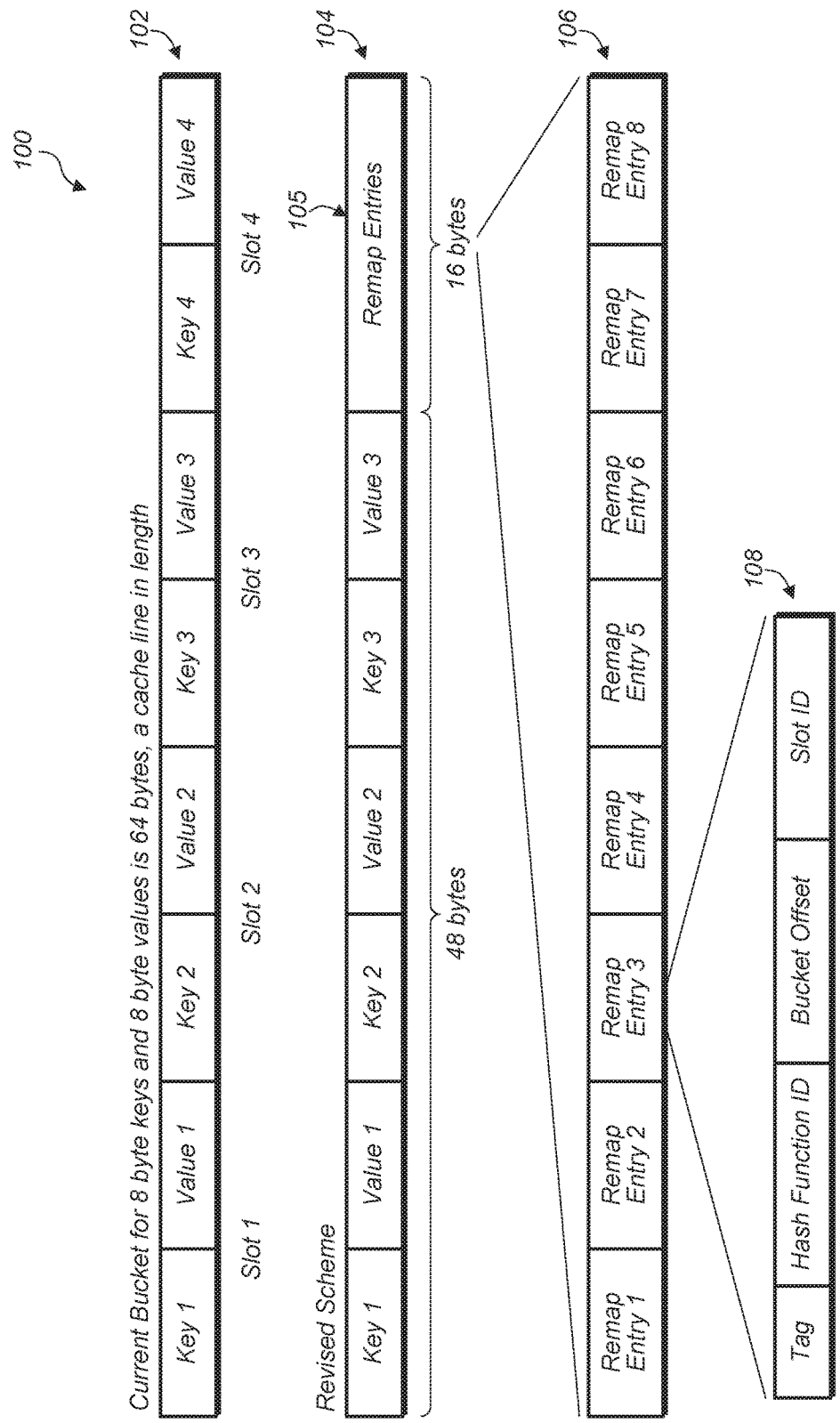
FIG. 1 illustrates one embodiment of a traditional bucket scheme and a revised bucket scheme.

The embodiments described herein improve on bucketized cuckoo hash tables by reducing the number of buckets that need to be searched in order to satisfy both positive and negative hash table lookups. Because many workloads are often read-dominated, accelerating lookups is a high priority when designing hash tables. Current bucketized cuckoo hash tables that use 2 independent functions to select one of two buckets to hash each key-value pair offer improved bounds over many prior open-addressed hash tables with respect to the number of hash table locations examined for both positive and negative lookups. Many prior open-addressed hash table designs do offer amortized constant time lookups, but place no such guarantee on individual lookups. Bucketized cuckoo hash tables by contrast only require 2 buckets to be searched on negative lookups and 1.5 buckets, on average, to be searched on positive lookups (with a worst-case lookup cost of 2 buckets). Additionally, lookups are quite amenable to single instruction multiple data (SIMD) and single instruction multiple thread (SIMT) architectures because there is little to no control flow divergence. In addition, loop counts may be statically known, which means that they can be aggressively or entirely unrolled, saving what is comparatively expensive condition checking and branching.

Although bucketized cuckoo hash tables have benefits, the expected number of buckets searched for each class of lookup can be improved. For any kind of lookup, regardless of whether it is positive or negative, it would be desirable to arrive as close as possible to a single bucket lookup. The approaches described herein reduce the lookup cost in terms of buckets searched. This reduction in the number of buckets accessed has a number of positive benefits, each of which improve throughput, including:

1) Reduced cache pollution which increases the efficacy of caches.
2) Improved average access time to the hash table due to more of the hash table's associating cache lines hitting in cache.
3) Better utilization of cache and off-chip bandwidth.
4) Large hash tables found in big data applications commonly do not fit in caches. Improving off-chip bandwidth utilization delivers a performance boost for these applications.

As noted above, bucketized cuckoo hash tables are a common approach. However, they may generate more memory traffic than is desirable on lookups. In particular, a bucketized cuckoo hash table employs k>=2 hash functions to hash keys to buckets. Typically, k=2, so that each key can be mapped to one of two candidate buckets. Typically, to increase load factors and reduce expensive cuckoo remapping of items, on insertions the least full of the candidate buckets is selected. Since the least full bucket corresponds to either hash function with equal probability, the expected lookup cost for keys that are in the table (positive lookups) is 1.5 buckets. This corresponds to 1.5 cache lines as different buckets typically map to different cache lines. For keys that are not in the table, the lookup cost is 2 buckets or cache lines, since every slot of every bucket must be searched. In the general case, the algorithm requires $(k+1)/2$ buckets to be searched on positive lookups and k buckets searched on negative lookups.

FIG. 1 illustrates one embodiment that uses a "remap entry". One enabler of faster lookups in our embodiment(s) is the remap entry. Generally speaking, the remap entry allows buckets that have more items hashed to them than they have capacity for to remap those items to buckets that have spare capacity and keep a record in the original bucket of where the item has been rehashed in the table. In this section we present several candidate fields that could appear in a remap entry. However it is noted that alternative fields or approaches could be used independently or in conjunction to achieve similar functionality. In the described embodiments, we consider remap entries that consist of a subset of tag, remap function ID, bucket index offset, and slot index fields.

In the example of FIG. 1, an example of remap entry integration into a hash table is shown. In this example, keys and values are each 64 bits, remap entries are 16 bits, and cache lines are assumed to be 512 bits. Other embodiments may utilize different numbers of bits for each of these entities. In the example shown, a first bucket 102 is shown that illustrates a bucket that does not utilize a remap entry and generally corresponds to prior art. In this case, bucket 102 includes four key-value pairs. In contrast, the revised scheme 104 allows for tracking of remapping decisions when the first hash function maps a key-value pair to a bucket that is already full. In this example, bucket 104 includes three key-value pairs as well as remap entries 105. One embodiment of the contents 106 of remap entries 105 is shown. In addition, one embodiment of the contents 108 of a remap entry (Remap Entry 3) is shown. As noted above, in various embodiments a remap entry includes a tag field, a remap function identifier (ID) field, a bucket index offset field, and a slot index field.

In one embodiment, the tag is a hash computed on the longer key associated with the remapped item. Because the tag is shorter than the original key, it saves on space allowing several remap entries to fit in the same space as a single key-value pair. However, this tag may also allow for false positives known as aliases (i.e. where two keys hash to a same value). The function ID specifies what hash function was used to rehash the item that overflowed the bucket. Having such a field allows for flexibility in terms of how the item is remapped, as the most common cuckoo hash table only typically employs 2 hash functions, whereas a k bit function ID field allows for up to $2^k$ different functions for remapping. The bucket index offset field can be used in conjunction with the hash function ID to compute the location of the bucket in the table the overflow item was remapped to. For instance, if the function ID field is set to 3 and the bucket index offset is 4, then the item is stored at bucket (hash_function_3(item_key)+4) % number_of_table_buckets. As such, the bucket index offset field can be thought of as a specialization of the function ID field.

The slot index of the remap entry augments the function ID and bucket index offset by further specifying which slot in the bucket the item maps to. Using the previous example, if the slot index is 3, then the item would be found remapped to the bucket at index (hash_function_3(item_key)+4) % number_of_table_buckets and would appear in the $3^{rd}$ slot of that bucket (assuming we start counting slots at 0).

It is noted that some of these fields are optional and can be done away with while still supporting remapped lookups. The bucket index offset field is a specialized case of a function ID field. Whereas a function ID can reference any hash function, the bucket index offset is more limited in what it can encode. At a minimum, one of these fields is used to form a valid remap entry if more than one hash function is used for remapping. Otherwise, if k hash functions are used for remapping, then in the worst case all k feasible buckets would have to be searched since we wouldn't know which one was used in advance. The slot index is also an optional field. It reduces the number of key comparisons that need to be made in the remapped bucket from as many as the number of slots per bucket to one. Including the slot index field trades space for quicker lookup speeds. Alternatively, for a fixed remap entry size, the inclusion of the slot ID and a shorter tag trades off fewer key comparisons in exchange for more tag aliasing.

In the example shown in FIG. 1 with 64 bit keys and values, only three key-value pairs can be stored in the revised scheme 104 compared to four key-value pairs in the original scheme 102. Consequently, only 75% of the space of the bucket 102 (and hash table) can be used for actual key-value storage. In one embodiment, a mix of traditional buckets and the modified buckets with remap entries are used. Only when a bucket overflows is the final slot of the bucket "repurposed" to remap entries. In other words, the bucket is originally configured to store four key-value pairs. Only when a fifth mapping is required does the final slot change to a remap entry as describe in FIG. 1. This hybrid strategy reduces the amount of space used for remap entries, but is still not enough to typically allow load factors that are competitive with cuckoo hashing once the space overhead of remap entries is considered. Most of this space overhead comes from storing tags, which are relatively long to prevent frequent aliasing. As may be appreciated by those skilled in the art, tags should only be so long that they reduce aliasing to within an acceptable degree but not so long that that benefit is outweighed by the additional storage cost or a drastic reduction in the width of other fields that deliver greater remapping flexibility such as the function ID and bucket offset fields.

In the example above that uses a combination of both bucket types from FIG. 1, a bucket with remap entries can store three key-value pairs and track an additional eight (i.e., Remap Entries 1-8) that need to be remapped. If we assume the keys of the key-value pairs are drawn from a uniform distribution, then even on a table with a few million elements, it is more likely than not that multiple keys will map to one of the buckets, exceeding the capacity of what can be stored and remapped with sufficient tracking.

Figure 2:
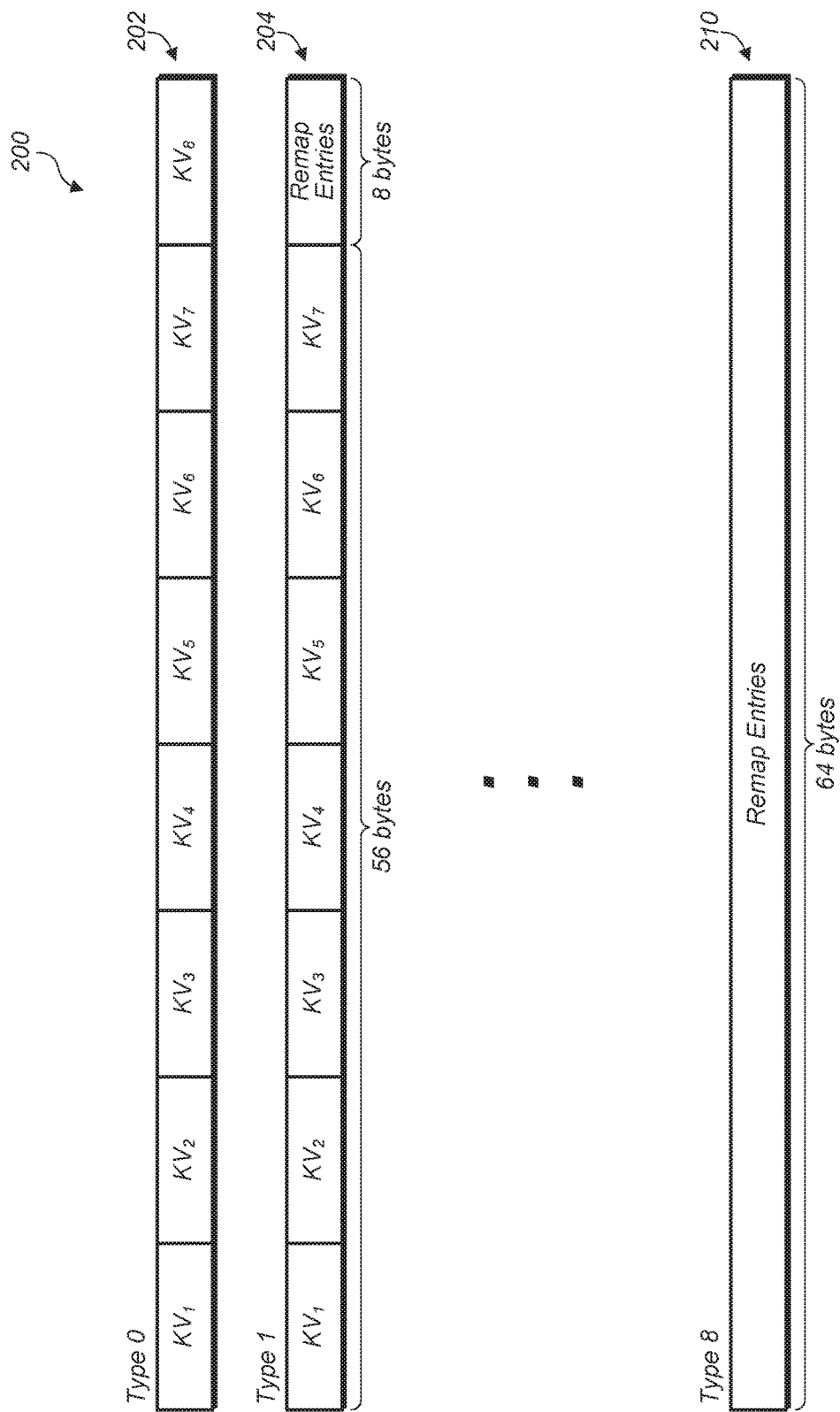
FIG. 2 illustrates one embodiment of bucket with slots progressively converted to remap entries.

FIG. 2 shown an embodiment for remap entries that allows a variable proportion of each bucket's space to be allocated to key-value pairs and remap entries for key-value pairs that overflow the initial bucket that they were assigned. In various embodiments, additional slots of a bucket are converted to remap entries if more than a given number of keys map to the same bucket. For example, if more than 11 keys map to the same bucket (i.e., In the example embodiment of FIG. 1—three keys stored in slots plus eight remapped entries), or more generally if both the free slots and the remap entries have been exhausted, then an additional slot may be converted to a remap entry. Using this scheme with 2 byte remap entries allows for up to 32 keys to hash to any single bucket. As shown in the example of FIG. 2, a bucket may begin life as having eight slots for storing key-value pairs (Type 0, which includes $KV_1$-$KV_8$) bucket 202. Subsequently, one of the slots (KV8) is converted to a remap entry as shown by bucket 204 (Type 1). This process of converting slots to remap entries may continue until finally the entire bucket 210 (Type 8) consists solely of remap entries (minus any additional bits reserved for encoding the bucket type or additional metadata).

The variability in the number of remap entries for each bucket means that buckets that do not need additional remapping save on space by not allocating remap entry storage for the worst case situation. A downside of this approach is that it complicates operations on the hash table, especially in a SIMD context, because naïve insertion, deletion, and lookup algorithms are likely to experience high control flow divergence if it is a frequent occurrence that one or more lanes need to do extra work to accommodate the fact that some buckets have more remap entries than others.

Another challenge is that all the variable types of buckets need to be encoded. In this specific parametrization, simple implementations would expect having to use 4 bits per bucket to identify the 9 types (i.e., Type 0 which has no remap entries to Type 8 what has eight remap entries). This storage cost could potentially be hidden using some encoding methods that employ lookup tables to compress buckets, but it is another layer of complexity. A further challenge is determining how big remap entries should be such that the tradeoff between space, lookup time, and the amount of different types of information that can be encoded is balanced subject to application-level criteria.

In some embodiments, 16 bits per remap entry may not be tenable, if we want to maximize the load factor, and rather 8 bits per remap entry may be more realistic. In this case, very little additional data can be encoded other than the tag. Assuming we use 5 of 8 bits for the tag, that affords only 3 bits in total for encoding both the function ID, and bucket and slot offsets. At the same time, 5 bits for each tag only affords 32 distinct tag values, which leads to high rates of tag aliasing, i.e. where two or more keys may hash to the same tag, which can yield false positives on lookups. In the following discussion, approaches are described that address some of these challenges when maximizing the load factor is of concern.

Figure 3:
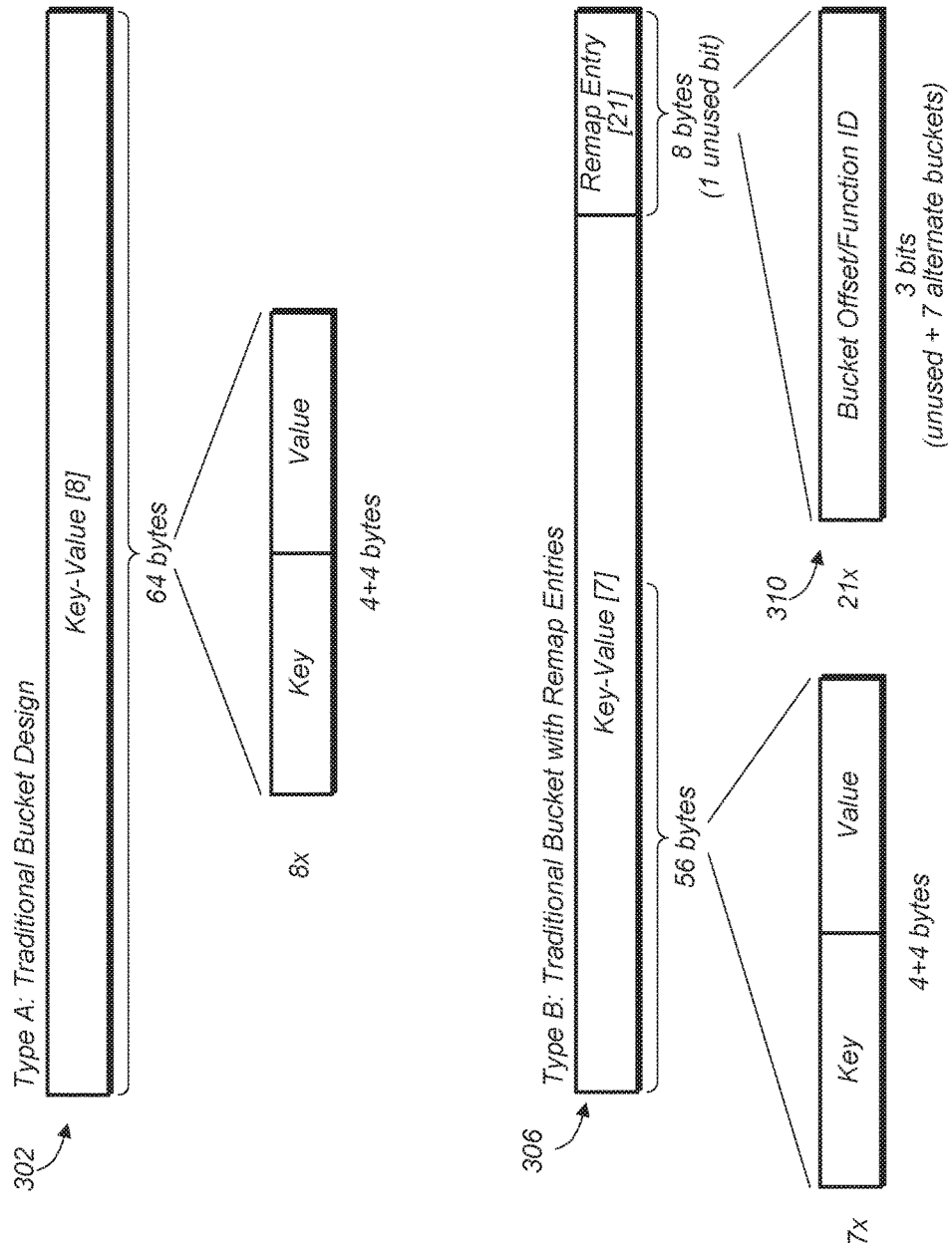
FIG. 3 is a diagram of one embodiment of a traditional bucket scheme and a modified traditional bucket scheme to include remap entries.

In one embodiment, a scheme that uses less space than the basic remap entry design described above uses implicit tags, as shown in FIG. 3. Implicit tags work by storing remap entries in an array where, instead of storing the tag in the remap entry, it is used as the index of the remap entry in the array. An index may be computed from the tag by using all or a subset of the bits of the tag as the index, by computing the value of the tag modulo the remap entry array size, or by applying some other function to the tag that results in a numerical index. FIG. 3 illustrates an example of this hybrid scheme 306 (Type B) that uses implicit tags for remap entries compared to a traditional scheme 302 (Type A). For practicality, only the bucket offset or function ID is encoded (310). However, other embodiments may encode other fields. In this scheme, by avoiding storing the tag, we are able to encode many more remap entries in the same amount of space. In the example of FIG. 3, the 8-byte final slot is converted to a 21-entry remap array where each entry is 3 bits (with 1 unused bit). This allows for seven different second-level remapping hash functions to be encoded using the 3-bit remap entries, in addition to the primary hash function that is used for first-level mappings. An additional benefit of the implicit tags scheme is that it avoids the need to do explicit tag comparisons between the tag hash calculated on the lookup key and tags stored in remap entries. Such comparisons are relatively cheap on lookups, but managing many tags has hidden complexity. For instance, what should happen if two or more keys have the same tag hash? This question is answered in the following discussion.

When explicitly storing tags in remap entries, the challenge of two or more keys sharing the same tag hash is if each is given its own remap entry, then each time we have to check for a match on the remap entries we must check all remap entries (the first match is not enough). Consequently, up to k additional buckets may need to be brought in to cache, where k is the number of items that alias on a specific tag hash. In both the implicit and explicit tag remap entry schemes, handling remap entries with duplicate tags can be addressed using a variety of approaches as follows.

Approach 1—Buckets that have two or more keys that share the same tag hash share the same remap entry.

If we do not care about deleting remap entries, then we can use the hash functions unaltered, assuming that one of the hash functions satisfactorily remaps each key-value item that aliases on the tag hash to a bucket with spare capacity.

In the case where we want to be able to delete remap entries that no longer are necessary, then we have to be able to find all keys that share a remap entry. Otherwise, we cannot safely delete it as there may be one or more remaining, remapped key-value pairs that still use it. One strategy is to change the way remapping works such that the set of hash functions that remap keys and values operate not on the key but rather on a combination of the bucket index as well as the tag and are remapped to a limited subset of all buckets in the hash table, which makes the search for all keys that a remap entry can reference tractable. In the ideal case, all key-value pairs that share a remap entry for a given bucket would remap to the same secondary bucket.

Approach 2—When attempting to insert a key-value pair KV that aliases with the tag of an existing remap entry, swap KV with an existing key-value pair in the bucket KV', and remap KV' instead.

This approach guarantees a one-to-one correspondence between key-value pairs and remap entries. Because of the one-to-one correspondence, it is safe to delete a remap entry when the item it references is removed.

Approach 3—Combine approaches 1 and 2.

The disadvantage of 1 is that it often does not permit high load factors due to conflicts. The disadvantage of 2 is that it requires additional atomic operations on conflicts due to swapping of the initial insert element KV with KV'. Combining 1 and 2 together allows for getting the best aspects of each.

Approaches 1 and 3 allow for what we term as constructive aliasing, where two or more remapped key-value pairs share a single remap entry. When possible, constructive aliasing can be a win because it allows for more items to be remapped than there are physical remap entries as well reducing the total number of remap entries that need to be used, which can reduce the expected number of buckets that need to be searched on negative lookups.

In various embodiments, the implicit and explicit tag schemes discussed above can be combined. For instance, we may want to limit the amount of space that remap entries take up in a bucket but use long tags when possible to reduce false positives due to tag hash aliasing. In that case, longer tags are used when we have fewer entries that need to be remapped and shorter tags when more entries need to be remapped. One implementation of this scheme is to use long explicit tags initially and then switch to implicit tags when the number of items to remap exceeds what can be practically stored in the same space as an explicit tag scheme. For our previous examples, this transition point was when 4 to 8 elements overflow the primary bucket.

One of the advantages of the remap entry is that it is not restricted to using any one type of hashing. For example, any one or more of the following are possible:

Linear probing (i.e., placing a new key into the closest following bucket with an empty slot if the bucket is full) can be encoded by having remap entries with a Bucket Offset Field. If the bucket offset field is k bits long, and we assume one value is assigned to mark the entry as empty, then the maximum probe length we can encode is $2^k-1$.

Double hashing uses a combination of two hash functions $H_1$ and $H_2$ to hash a key-value pair. $H_1$(key) maps the key to its preferred location. However, if that bucket is already taken, then we attempt to rehash the key-value pair to another bucket by using a stride that is defined by $H_2$(key). So the full hash is H(m, key)=$H_1$(key)+ m*$H_2$(key), where m is the number of times we have attempted to rehash the key-value pair and failed. By storing m in the hash function ID field, we can encode double hashing.

Cuckoo hashing can be encoded by using the function ID field of each remap entry.

Combinations of the above hash function mechanisms as well as numerous others can be encoded using the function ID/bucket offset bits of each remap entry.

Handling Insertions

For insertions we describe the hybrid algorithms from both the explicit and implicit tag versions of the remap entries, as they use Type A and Type B buckets (of FIG. 3) in the implicit tag case and a subset of the types described in the explicit tag scheme (e.g., using Types 0-8 inclusive of FIG. 2 is not necessary for functionality; for example, using 0 and 1 alone, or 0 and 8 alone would work). Insertions work by first attempting to use the primary hash function to insert items in to the hash table. Only when the primary hash function fails (bucket is full) are secondary hash functions employed for remapping items. This policy is in contrast to practical implementations of bucketized cuckoo hash tables where each key has roughly a 50% chance of mapping to one of two buckets when two hash functions are used. With only 2 hash functions, it is necessary to roughly evenly distribute the items between buckets on each insertion. Otherwise, it is often difficult to achieve high load factors.

Buckets that are Type 0 or Type A

For buckets that are Type 0 (FIG. 2) or Type A (FIG. 3), these are regular (traditional) bucketized hash table buckets with no remap entries. Assuming there are slots for k key-value pairs, then if less than k slots are full, the new key-value pair is inserted in one of the available slots. If all k-slots are taken, upgrade the bucket to the next logical type, i.e. Type B (FIG. 3) or Type 1 (FIG. 2). This process of upgrading will cause one or more key-value pairs to be evicted when their storage is repurposed for remap entries. When this happens, proceed by reinserting the evicted key-value pair(s) in addition to the initial key-value pair that triggered the promotion. This process will require following the insertion algorithm in the next section.

Buckets with Remap Entries

Assuming no regular slot is available or we choose not to use it, attempt to rehash the key-value pair to a secondary bucket using one of the available alternative bucket locations. If successful, register the success in a remap entry in the primary bucket. Handle any tag collisions using one or more of the algorithms described above in the discussion on handling tag aliasing conflicts. If no remap entries are available, promote the bucket to the next successive type of bucket if possible. For explicit tags, each Type k (e.g., Type 1) bucket would convert to Type k+1 (e.g., Type 2) when insufficient remap entries existed, assuming Type k+1 is defined. Any additional evicted items from promotion would be rehashed. An analogous process could be applied for the implicit tag scenario when we have a Type B bucket that can no longer add to the remap entry array. The introduction of a Type C bucket with 2 slots converted into remap entry storage is a viable option. Existing entries would likely need to be rehashed to take this into account.

Handling Lookups

Buckets that are Type 0 or Type A

Given a key K that we want to look up, compute the primary hash function $H_1$ on K and access the referenced bucket. If K does not match any of the keys of the key-value pairs in the bucket, then provide an indication that no match is found (e.g., return either an implicit or explicit encoding for KEY_NOT_FOUND). If K does match, return the value field of the matching key-value pair.

Buckets with Remap Entries

First attempt to match the key on the key-value pairs in that bucket. If that succeeds, return the value associated with the key-value pair with the matching key. On failure, compute the tag hash of the key and search (explicit tag) or index (implicit tag) the remap entries for a match. If no match on a remap entry is achieved, return either an implicit or explicit encoding for KEY_NOT_FOUND. If a match is found, then follow the combination of Bucket Offset, Function ID, and Slot Offset fields, or the available subset thereof, to the correct bucket or slot. If the key matches the key of a key-value pair in a full slot of that bucket, return the value. If it does not, return KEY_NOT_FOUND.

Handling Deletions

If a lookup on a key to be deleted fails, then we can optionally return a status code such as KEY_NOT_FOUND. If the key is in the table, delete the key-value object that corresponds to the key-value pair. If the key-value pair has a remap entry associated with it that can safely be deleted, then delete it.

Making Insertions Faster

Figure 4:
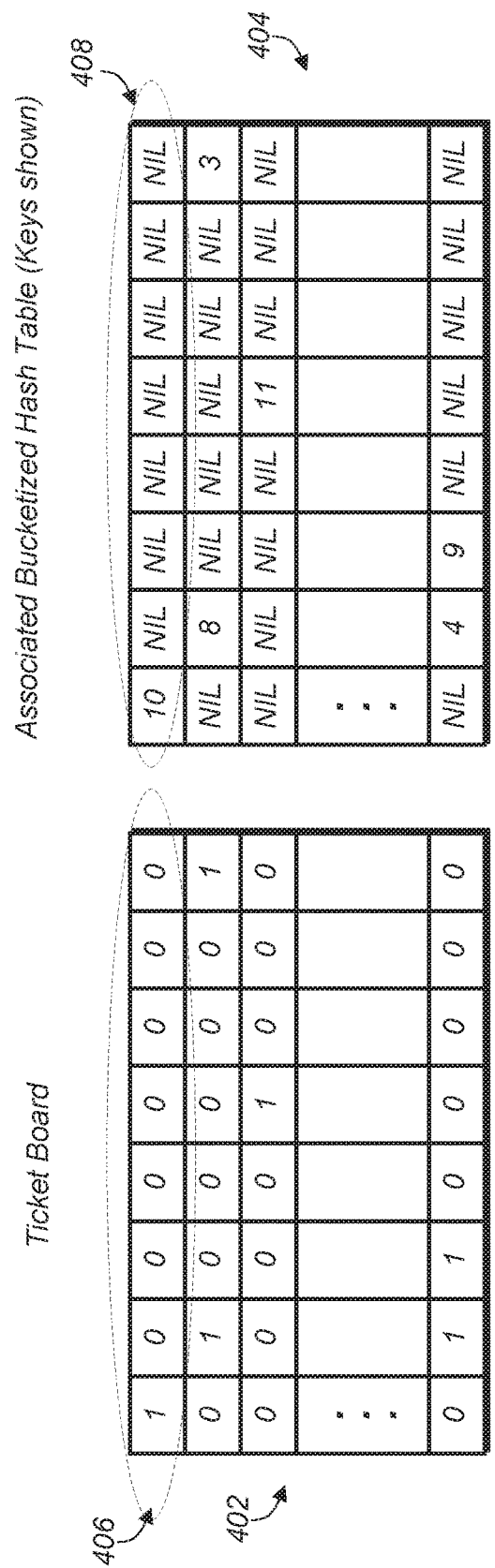
FIG. 4 illustrates one embodiment of a ticket board data structure associated with a hash table.
Figure 5:
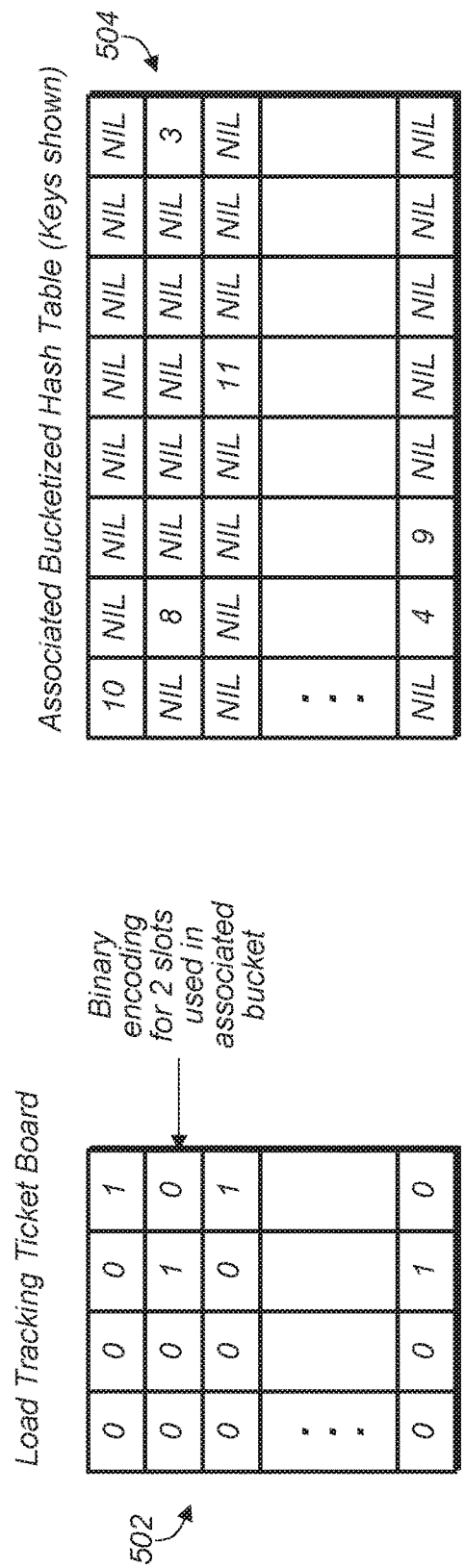
FIG. 5 illustrates one embodiment of a load tracking ticket board data structure associated with a hash table.

In order to make insertions faster, various embodiments use an additional data structure known as a ticket board. FIGS. 4 and 5 illustrate two different ticket board designs. In the first (FIG. 4), each bit in the ticket board (402) is an empty/full variable with a one-to-one correspondence to a key-value pair slot in the bucketized hash table (404). If a slot is empty, the associated ticket board empty/full variable is 0; if it is full, then 1. Of course an alternative embodiment may reverse these values, or use different values altogether. In the example of FIG. 4, only a portion of a ticket board and corresponding hash table are shown. For example, the eight bits of ticket board entry 406 correspond to the bucket 408 that has eight slots. In various embodiments, buckets and cache lines are each 512 bits, and key-value pairs are 8 bytes in size. However, other sizes are possible and are contemplated.

The second example shown in FIG. 5 illustrates a load tracking ticket board (502) and corresponding Hash Table (504). Unlike FIG. 4, the load tracking ticket board only tracks how many slots are full in each bucket. Because binary can be used rather than unary, a k-slot hash table bucket would only require log 2(k+1) bits to track its load in the ticket board. On an insertion into the table, the associated counter in the ticket board would be incremented. Deletions would decrement the counter. Lazy updates to the ticket board could be applied as long they do not affect algorithmic correctness. In various embodiments, this ticket board is used to speed up insertions by tracking how full each bucket is. Using the ticket board, the goal is to reduce the number of cache lines that need to be touched in the hash table on an insertion to at most 2 (excludes accesses to ticket board), one for the first bucket lookup and the second for the secondary remapping to a bucket that is known (based on the ticket board) to contain empty slots. In some embodiments, the ticket board may be used to select the secondary bucket that best meets a certain criteria, such as the one with the most number of empty slots among the candidate buckets. We would also like to minimize the number of cache line accesses from the ticket board. Assuming hash table buckets with 8 slots and a cache line of 512 bits, a single cache line of a traditional ticket board can encode 512/8 or 64 different buckets to remap to (shown as the first ticket board design of FIG. 4) and a load tracking ticket board 512/4 or 128 different buckets to remap to (shown by the second ticket board design of FIG. 5).

While 64 and 128 viable contiguous buckets limits the set of hash policies that can be implemented, we note that in practice it is possible to limit ticket board accesses to a single cache line per insertion using linear probing, double hashing, and cuckoo hashing with some minor tweaks. Linear probing carries over provided that the maximum bucket probing length is less than 64 (or 128) and that offsets wrap around so that only one cache line of ticket board is accessed. Double hashing and cuckoo hashing by the same virtue need to limit their hashing range, so that it is within the bounds of a single cache line of the ticket board.

Figure 6:
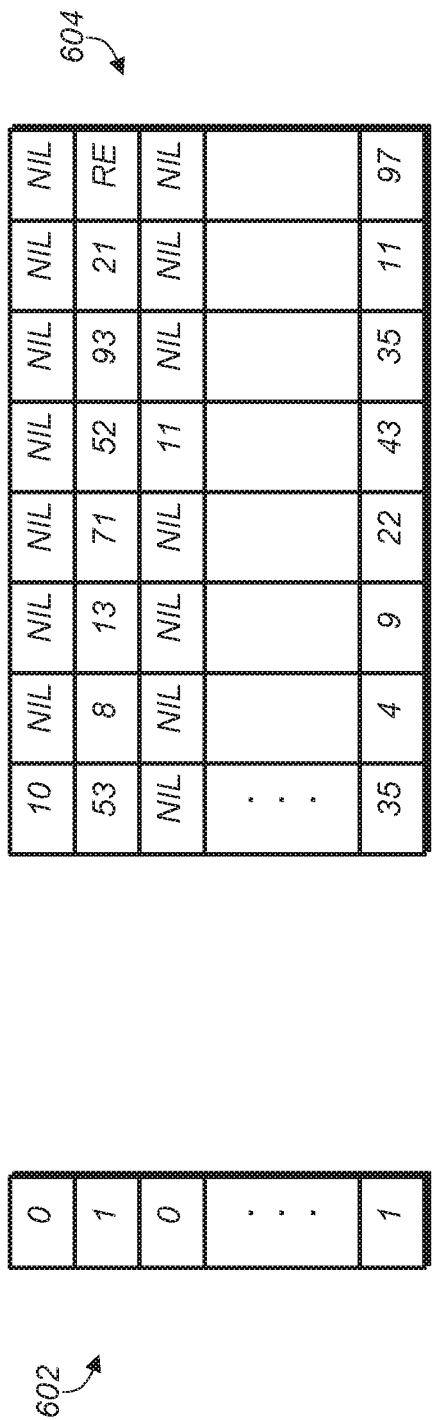
FIG. 6 illustrates one embodiment of a method for performing an insertion in a bucketized hash table.

In some embodiments, a variant of the ticket board uses a single bit per bucket to encode whether the bucket has free capacity as shown in FIG. 6. FIG. 6 illustrates a portion of a load tracking ticket board (602) and corresponding Hash Table (604). In the example shown, if the bucket has a free slot, it is encoded with a zero bit, and if it is full it is encoded with a one bit. Of course, the reverse or other encodings could be used. In the example above, the uppermost bit in the ticket board 602 corresponds to the bucket represented by the top row of the hash table 604. In this example, seven slots remain available in the top row of the hash table 604. Therefore, the corresponding bit in the ticket board is set to "0". The next row of the hash table has no available entries. Therefore, the corresponding bit in the ticket board is set to "1". The third row has entries available, and so the corresponding bit of the ticket board 602 is set to "0", and so on. If the bucket was full but had one or more slots housing items hashed there with a function other than the primary hash function, then a zero bit could be used to signify that those secondary items are remappable. One benefit of having a single bit in the ticket board per bucket to encode partial/complete fullness is that only insertions that caused a bucket to go from partially full to completely full (or vice-versa for deletions) would require updating the ticket board to maintain an accurate representation of the table. This is in contrast to the policies shown in FIG. 4 and FIG. 5, where accurately tracking fullness at a slot granularity requires updating the ticket board on every insertion and deletion that modifies the hash table. Further, with only a single bit per bucket in the ticket board and 512 bit cache lines, the space overhead of the ticket board relative to the hash table would only be 1/512 or 0.195%. For each 512 cache lines of the hash table, only 1 cache line worth of ticket board would need to be allocated. If the hash table is broken into partitions, each with its own ticket board, then provided the partitions are sufficiently small, the ticket board could reside entirely in the private caches. For example, if we wanted to size the ticket board to half of a L1 data cache of size 32 KB so that it is unlikely to be evicted, then each hash table partition would have to be less than or equal to 16384*512=8,388,608 buckets in size.

Alternate schemes could permit more than one cache line from the ticket board to be accessed on insertions. It is worth noting that the ticket board does not need to be accessed on lookups, and that it can be deallocated for hash tables that are built once and never modified further. On deletions, one can eagerly update the ticket board immediately, but there is nothing from a correctness standpoint preventing the viability of a lazy approach, where the ticket board is updated on a sporadic basis.

Additional space savings are possible for the ticket board. In the implicit tags approach with the load tracking ticket board, if there are S slots per bucket, we would need to encode buckets that are either completely empty or contain 1 to S *empty* slots. If S+1 is not a power of 2, multiple ticket board entries could be compressed together to take up less space. For instance, if we have buckets with 8 slots, that leaves 9 states that we need to encode, or 4 bits worth of storage. However, if we group 2 slots together, that's 9*9 states that we need to encode, or 7 bits worth of storage, a savings of half a bit per item. Such a scheme is typically accomplished via a lookup table or by using a space filling curve and its inverse to encode and decode symbols used for compression.

As a further optimization, the ticket board could encode additional information that describes which slots store what kind of element, e.g. an additional value to signify a slot currently stores a secondary item in the per slot ticket board (FIG. 4), and in the load tracking ticket board (FIG. 5) the relative counts of empty slots, primary and secondary items per bucket.

Figure 7:
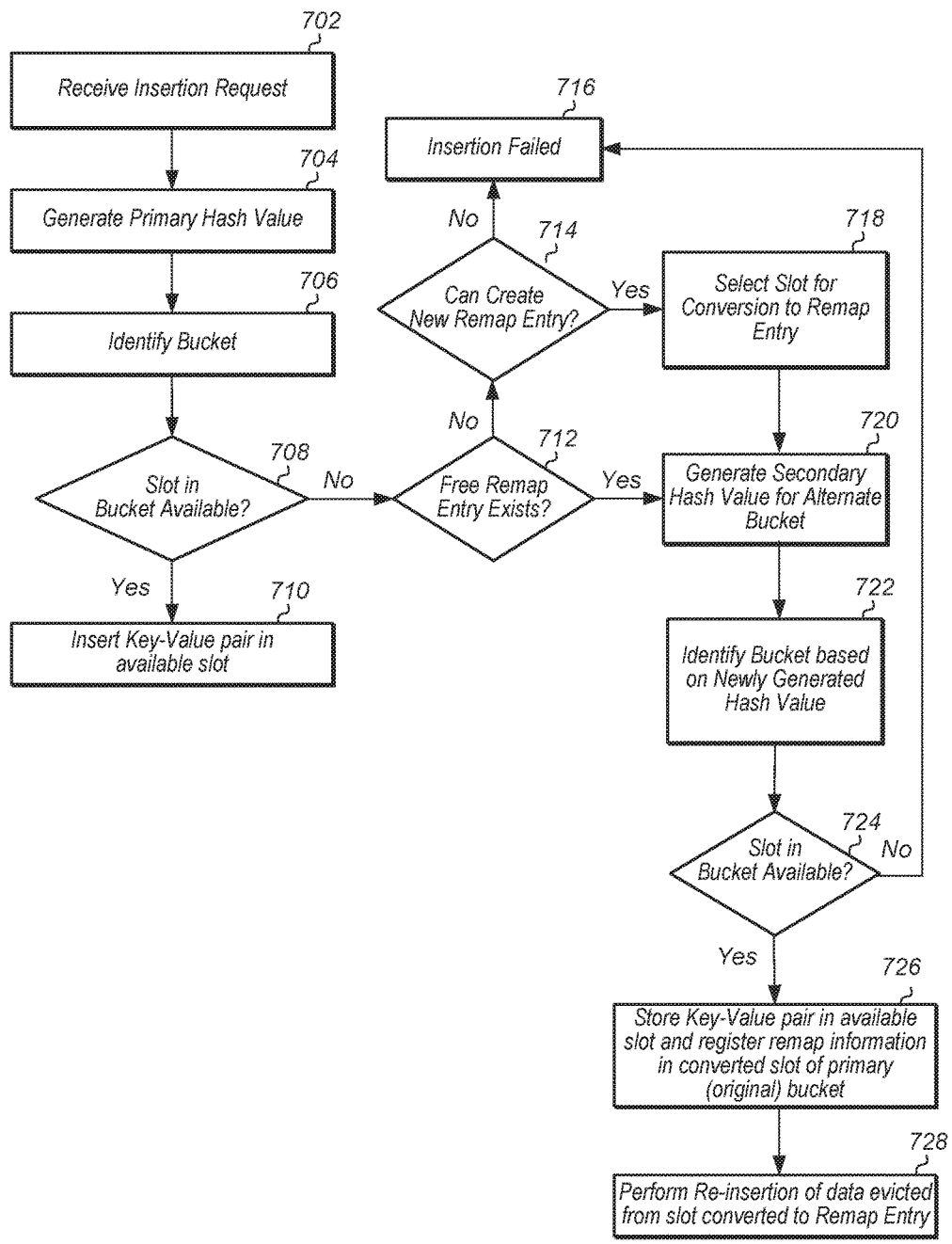
FIG. 7 illustrates one embodiment of a method for performing a lookup in a bucketized hash tables.

Referring now to FIG. 7, one embodiment of a method for performing insertions in a hash table is shown. In the exemplary embodiment, a request to insert a key-value pair is received (702) and a corresponding primary hash value is generated (704) by applying the primary hash function to the key. Using the hash value, a bucket corresponding to the key is identified (706) and a determination is made as to whether the bucket has a slot available (i.e., not currently being used for valid data) for storing the key-value pair (conditional block 708). If such a slot is available, then the key-value pair is stored in the available slot (710). If, on the other hand, a slot is not currently available in the bucket (i.e., all slots of the bucket are currently in use), then a determination is made as to whether a free remap entry in the bucket currently exists (block 712). If no free remap entry exists, then it is determined whether a new remap entry can be created (block 714). If new remap entry cannot be created, then the insertaion fails (716). If a new remep entry can be created, then one of the existing slots is selected for conversion to a remap entry (718). Note that the key-value pair that was previously in the slot converted to a remap entry in this case is re-inserted into the table using an alternate hash function, the process for which is not shown in the figure for clarity. A new hash value is generated for the key-value pair to be inserted into the hash table (e.g., using a secondary hash function) (720), and a new bucket is identified that corresponds to the new hash value (722). If there is a slot available in the newly identified bucket (conditional block 724), then the key-value pair is stored in the available slot (726) and remapping information for the stored key-value pair is stored in the appropriate remap entry in the primary (original) bucket. Data that was previously stored in the slot that was converted to a remap entry is re-inserted into the table according to the method of FIG. 7 (block 728). If in conditional block 724 there is not a slot currently available in the newly identified bucket, then the insertion fails (716) assuming there is only one secondary hash function. In embodiments with more than one secondary hash function, the process is repeated with another secondary hash function (e.g., beginning at block 720).

Figure 8:
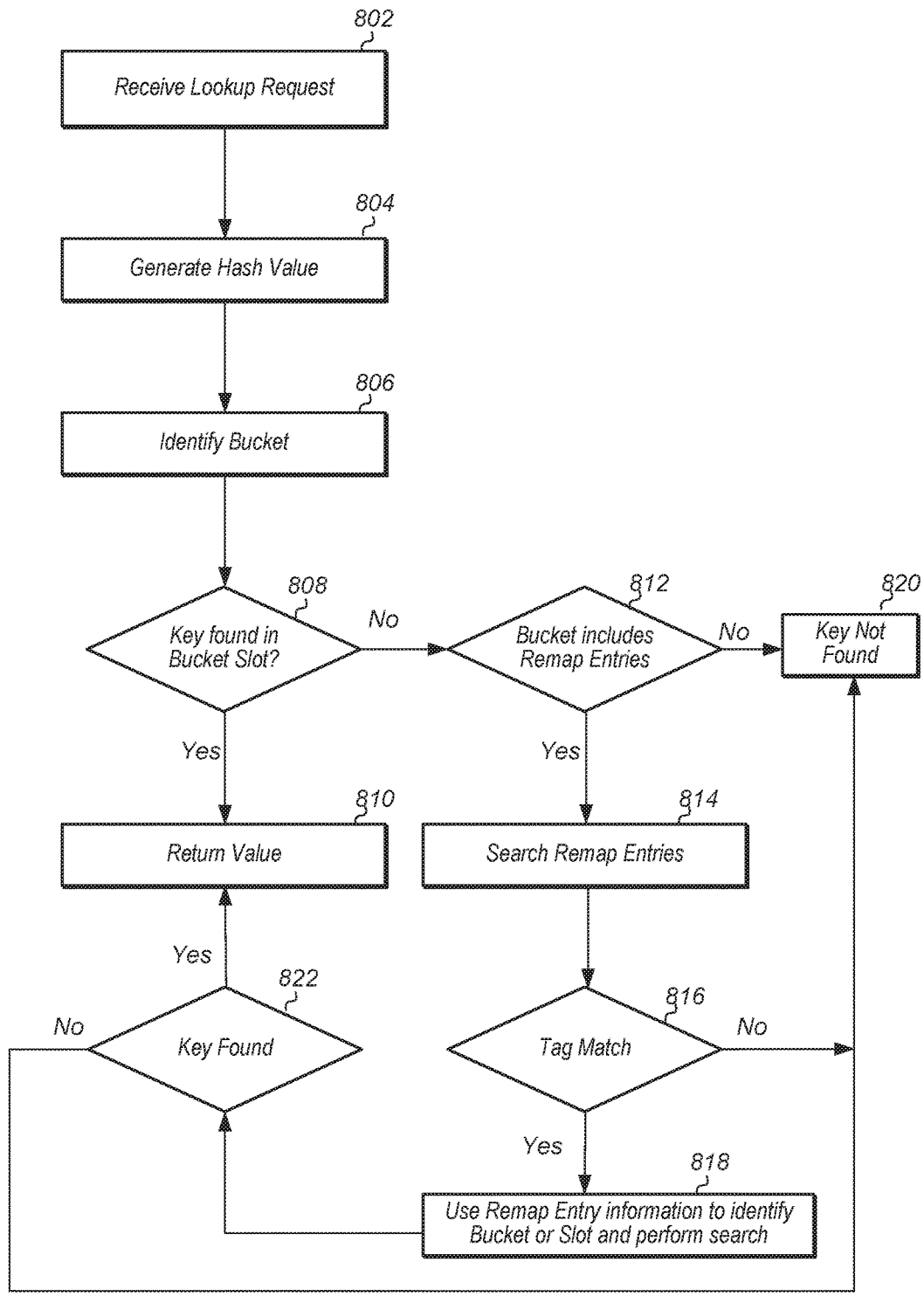
FIG. 8 illustrates one embodiment of a system incorporating the bucketized hash tables.

FIG. 8 illustrates one embodiment of a method for performing a lookup of data in a hash table. Given a key K that we want to look up (802), compute the primary hash function on K (804) and access the referenced bucket (806). If the key K is found in the bucket (i.e., in a slot of the bucket) (conditional block 808), then the corresponding value is returned (810). However, if the key is not found in the bucket and the bucket includes no remap entries (conditional block 812), then an indication that the key is not found is returned (820). If the bucket does include remap entries (812), then the remap entries are searched (814). If the tag is found (816), then the remap entry is used to identify the bucket potentially storing the corresponding key-value pair (818), the identified bucket is searched for the key, and the value is returned (810) if the key is found (822). If the tag is not found in the remap entries (conditional block 816), then an indication that the key is not found is returned (822).

Figure 9:
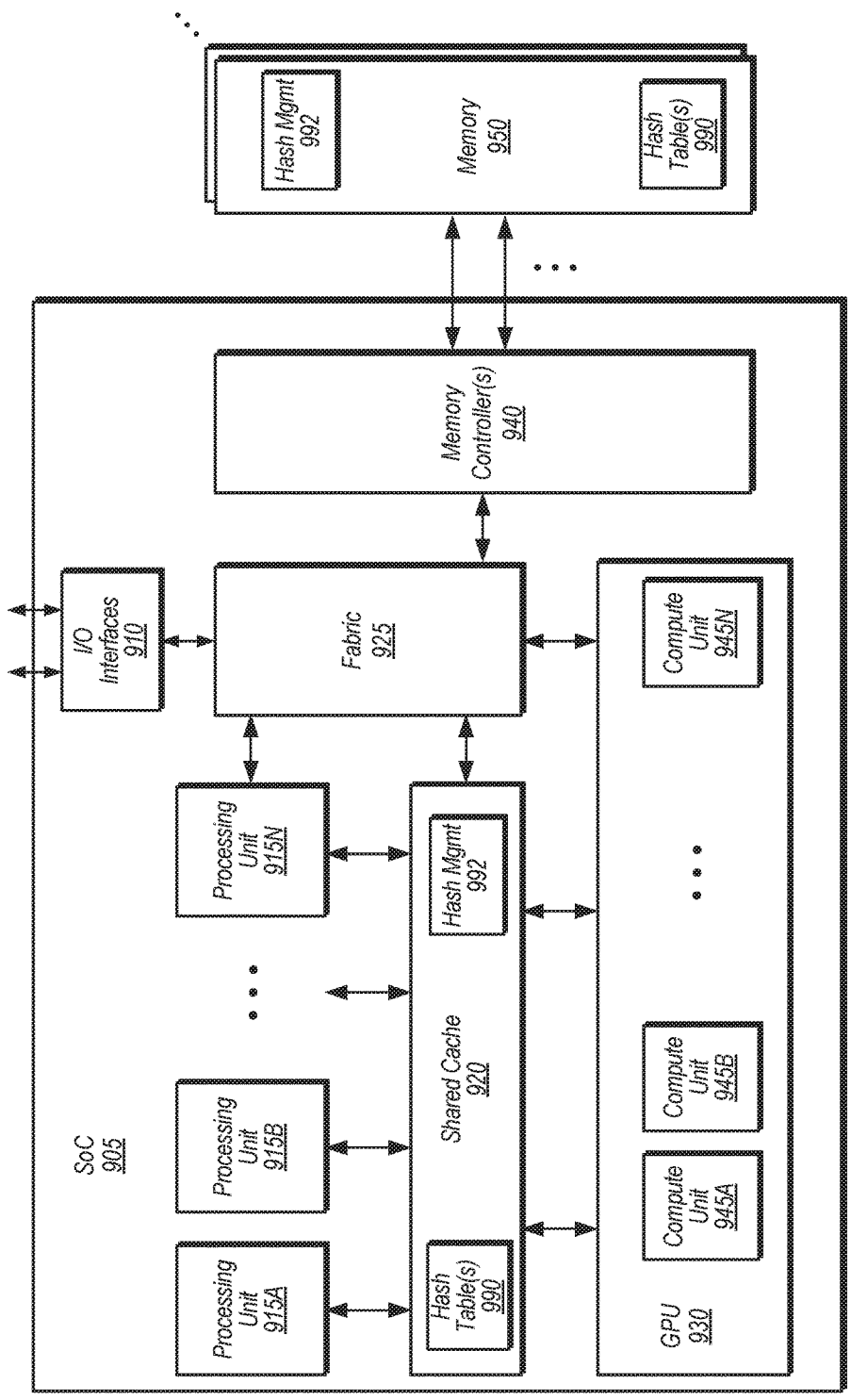
FIG. 9 illustrates one embodiment of a system including hash tables.

Referring now to FIG. 9, a block diagram of one embodiment of a computing system 900 that utilizes the above described bucket schemes is shown. In one embodiment, computing system 900 includes system on chip (SoC) 905 coupled to memory 950. As shown, memory 950 is shown to include hash tables 990 and hash management logic 992 (e.g., program code executable by processing units 915 or compute units 945) configured to manage the various hash table functions described herein. In other embodiments, hash management circuitry may be included (not shown) that performs the functions of the has management logic 992. Various portions of the hash table(s) 990 and hash management logic 992 may also be cached in shared cache 920 and/or caches local to any of processing units 915 or graphics processing unit (GPU) 930. In some embodiments, system 900 may include circuitry configured to perform the various hash table functions described here. SoC 905 can also be referred to as an integrated circuit (IC). In one embodiment, SoC 905 includes processing units 915A-N, input/output (I/O) interfaces 910, shared caches 920A-B, fabric 925, graphics processing unit 930 and memory controller(s) 940. SoC 905 can also include other components not shown in FIG. 9 to avoid obscuring the figure. Processing units 915A-N are representative of any number and type of processing units. In one embodiment, processing units 915A-N are central processing unit (CPU) cores. In another embodiment, one or more of processing units 915A-N are other types of processing units (e.g., application specific integrated circuit (ASIC), field programmable gate array (FPGA), digital signal processor (DSP)). Processing units 915A-N are coupled to shared caches 920A-B and fabric 925.

In one embodiment, processing units 915A-N are configured to execute instructions of a particular instruction set architecture (ISA). Each processing unit 915A-N includes one or more execution units, cache memories, schedulers, branch prediction circuits, and so forth. In one embodiment, the processing units 915A-N are configured to execute the main control software of system 900, such as an operating system. Generally, software executed by processing units 915A-N during use can control the other components of system 900 to realize the desired functionality of system 900. Processing units 915A-N can also execute other software, such as application programs.

GPU 930 includes state registers 935, state set storage elements 939, and compute units 945A-N which are representative of any number and type of compute units that are used for graphics or general-purpose processing. GPU 930 is coupled to shared caches 920A-B and fabric 925. In one embodiment, GPU 930 is configured to execute graphics pipeline operations such as draw commands, pixel operations, geometric computations, and other operations for rendering an image to a display. In another embodiment, GPU 930 is configured to execute operations unrelated to graphics. In a further embodiment, GPU 930 is configured to execute both graphics operations and non-graphics related operations. In one embodiment, the output of operations executed by GPU 930 is dependent on a current architectural state of compute units 945A-N. In one embodiment, the architectural state is based on the values of various context-specific constants such as texture handlers, shader constants, transform matrices, and so forth which are stored in state registers 935.

In one embodiment, GPU 930 is configured to switch its current state of execution to one of the architectural states specified in the state sets stored in state set storage elements 939. Each state set stores values indicative of a respective architectural state for GPU 930. By using locally stored state set storage elements 939, GPU 930 is able to perform a context switch to a stored state without accessing external memory.

In one embodiment, GPU 930 is configured to reserve a state set without changing its current state of execution. For example, GPU 930 is configured to detect a software request to reserve a state set of state set storage elements 939. In one embodiment, GPU 930 receives a request to reserve a state set for a first state while GPU 930 is currently in a second state based on the values in state registers 935. Without switching out of the second state, GPU 930 reserves and stores values of the first state in one of the state sets. Later, a software command for using the first state is detected by GPU 930, and GPU 930 loads the values from the corresponding state set into state registers 935 to enter the first state. Depending on the embodiment, the software commands for reserving and using a state set are generated by a user application, a user mode driver, or another software application.

I/O interfaces 910 are coupled to fabric 925, and I/O interfaces 910 are representative of any number and type of interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 910. Such peripheral devices include (but are not limited to) displays, keyboards, mice, printers, scanners, joysticks or other types of game controllers, media recording devices, external storage devices, network interface cards, and so forth.

SoC 905 is coupled to memory 950, which includes one or more memory modules. Each of the memory modules includes one or more memory devices mounted thereon. In some embodiments, memory 950 includes one or more memory devices mounted on a motherboard or other carrier upon which SoC 905 is also mounted. In one embodiment, memory 950 is used to implement a random access memory (RAM) for use with SoC 905 during operation. The RAM implemented can be static RAM (SRAM), dynamic RAM (DRAM), Resistive RAM (ReRAM), Phase Change RAM (PCRAM), or any other volatile or non-volatile RAM. The type of DRAM that is used to implement memory 950 includes (but is not limited to) double data rate (DDR)

DRAM, DDR2 DRAM, DDR3 DRAM, and so forth. Although not explicitly shown in FIG. 9, SoC 905 can also include one or more cache memories that are internal to the processing units 915A-N and/or compute units 935A-N. In some embodiments, SoC 905 includes shared caches 920A-B that are utilized by processing units 915A-N and compute units 935A-N. In one embodiment, caches 920A-B are part of a cache subsystem including a cache controller.

In various embodiments, computing system 800 can be a computer, laptop, mobile device, server or any of various other types of computing systems or devices. It is noted that the number of components of computing system 800 and/or SoC 805 can vary from embodiment to embodiment. There can be more or fewer of each component/subcomponent than the number shown in FIG. 8. For example, in another embodiment, SoC 805 can include multiple memory controllers coupled to multiple memories. It is also noted that computing system 800 and/or SoC 805 can include other components not shown in FIG. 8. Additionally, in other embodiments, computing system 800 and SoC 805 can be structured in other ways than shown in FIG. 8.

In various embodiments, program instructions of a software application may be used to implement the methods and/or mechanisms previously described. The program instructions may be stored on a non-transitory computer readable storage medium. Numerous types of storage media are available. The storage medium may be accessible by a computing system during use to provide the program instructions and accompanying data to the computing system for program execution. The computing system may include at least one or more memories and one or more processors configured to execute program instructions.

What is claimed is:

1. A system comprising:
   a hash table configured to store data; and
   hash management logic coupled to the hash table;
   wherein in response to receiving a request to insert a key-value pair in the hash table, the hash management logic comprises circuitry configured to:
      generate a first hash value by applying a first hash function to the key of the key-value pair;
      identify a first bucket within the hash table that corresponds to the first hash value;
      in response to determining the first bucket has an unused slot available, store the key-value pair in the slot; and
      in response to determining the first bucket does not have an unused slot available for storing a key-value pair and no remap entries allocated in the first bucket for storing information identifying at least a second bucket are available:
         select a first slot of the first bucket for conversion to a set of two or more remap entries allocated in the first bucket for storing information identifying at least the second bucket;
         store the key-value pair in the second bucket; and
         store information associating the key-value pair with the second bucket in one of the remap entries of the first bucket.

2. The system as recited in claim 1, wherein in response to determining the first bucket does not have an unused slot available, the hash management logic is further configured to identify the second bucket by generating a second hash value of the key using a second hash function.

3. The system as recited in claim 2, wherein the hash management logic is configured to store the key-value pair in a slot of the second bucket in further response to determining an unused slot in the second bucket is available.

4. The system as recited in claim 3, wherein in response to determining the second bucket does not have a slot available and no further secondary hash functions are available, the hash management logic is configured to return an indication that the insertion failed.

5. The system as recited in claim 1, wherein the hash management logic is further configured to:
   receive a request to lookup a given key in the hash table;
   generate a first lookup hash value by applying a first hash function to the key of the key-value pair;
   identify a first bucket within the hash table that corresponds to the first lookup hash value; and
   in response to determining the first bucket within the hash table that corresponds to the first lookup hash value has a slot that stores a key matching the given key, return a value stored in the table that is associated with the key matching the request.

6. The system as recited in claim 5, wherein in response to determining the first bucket within the hash table that corresponds to the first lookup hash value does not have a slot that stores a key matching the given key, the hash management logic is configured to determine whether the first bucket within the hash table that corresponds to the first lookup hash value includes remap entries.

7. The system as recited in claim 6, wherein in response to determining the first bucket within the hash table that corresponds to the first lookup hash value does not have a slot that stores a key matching the given key, the hash management logic is further configured to:
   in response to determining the first bucket within the hash table that corresponds to the first lookup hash value does not include remap entries, return an indication that the given key is not found; and
   in response to determining the first bucket within the hash table that corresponds to the first lookup hash value does include remap entries:
      search remap entries of the first bucket for the given key; and
      if a match is found to the given key, search a second bucket identified by the remap entry matching the given key and return a value associated with the given key in the second bucket.

8. A method for managing a hash table in a computing system comprising:
   storing key-value pairs in a hash table;
   hash management logic:
      receiving a request to insert a key-value pair in the hash table;
      generating a first hash value by applying a first hash function to the key of the key-value pair;
      identifying a first bucket within the hash table that corresponds to the first hash value;
      in response to determining the first bucket has an unused slot available, storing the key-value pair in the slot; and
      in response to determining the first bucket does not have an unused slot available for storing a key-value pair and no remap entries allocated in the first bucket for storing information identifying at least a second bucket are available:
         selecting a first slot of the first bucket for conversion to a remap entry allocated in the first bucket for storing information identifying at least the second bucket;
         storing the key-value pair in a second bucket; and storing information associating the key-value pair with the second bucket in one of the remap entries of the first bucket.

9. The method as recited in claim 8, wherein in response to determining the first bucket does not have an unused slot available, the hash management logic is further configured to identify the second bucket by generating a second hash value of the key using a second hash function.

10. The method as recited in claim 9, wherein the hash management logic is configured to store the key-value pair in a slot of the second bucket in further response to determining an unused slot in the second bucket is available.

11. The method as recited in claim 10, wherein in response to determining the second bucket does not have a slot available and no further secondary hash functions are available, the hash management logic is configured to return an indication that the insertion failed.

12. The method as recited in claim 8, wherein the hash management logic is further configured to:
receive a request to lookup a given key in the hash table;
generate a first lookup hash value by applying a first hash function to the key of the key-value pair;
identify a first bucket within the hash table that corresponds to the first lookup hash value; and
in response to determining the first bucket within the hash table that corresponds to the first lookup hash value has a slot that stores a key matching the given key, return a value stored in the table that is associated with the key matching the request.

13. The method as recited in claim 12, wherein in response to determining the first bucket within the hash table that corresponds to the first lookup hash value does not have a slot that stores a key matching the given key, the hash management logic is configured to determine whether the first bucket within the hash table that corresponds to the first lookup hash value includes remap entries.

14. The method as recited in claim 13, wherein in response to determining the first bucket within the hash table that corresponds to the first lookup hash value does not have a slot that stores a key matching the given key, the hash management logic is further configured to:
in response to determining the first bucket within the hash table that corresponds to the first lookup hash value does not include remap entries, return an indication that the given key is not found; and
in response to determining the first bucket within the hash table that corresponds to the first lookup hash value does include remap entries:
search remap entries of the first bucket for the given key; and
if a match is found to the given key, search a second bucket identified by the remap entry matching the given key and return a value associated with the given key in the second bucket.

15. A non-transitory computer readable storage medium storing program instructions, wherein when executed by a processor unit the instructions are executable to:
store key-value pairs in a hash table;
receive a request to insert a key-value pair in the hash table;
generate a first hash value by applying a first hash function to the key of the key-value pair;
identify a first bucket within the hash table that corresponds to the first hash value;
in response to determining the first bucket has an unused slot available, store the key-value pair in the slot; and
in response to determining the first bucket does not have an unused slot available for storing a key-value pair and no remap entries allocated in the first bucket for storing information identifying at least a second bucket are available:
select a first slot of the first bucket for conversion to a set of remap entries allocated in the first bucket for storing information identifying at least the second bucket;
store the key-value pair in the second bucket; and
store information associating the key-value pair with the second bucket in one of the remap entries of the first bucket.

16. The non-transitory computer readable storage medium as recited in claim 15, wherein in response to determining the first bucket does not have an unused slot available, the program instructions are executable to identify the second bucket by generating a second hash value of the key using a second hash function.

17. The non-transitory computer readable storage medium as recited in claim 16, wherein the program instructions are executable to store the key-value pair in a slot of the second bucket in further response to determining an unused slot in the second bucket is available.

18. The non-transitory computer readable storage medium as recited in claim 17, wherein in response to determining the second bucket does not have a slot available and no further secondary hash functions are available, the program instructions are executable to return an indication that the insertion failed.

19. The non-transitory computer readable storage medium as recited in claim 16, wherein the program instructions are further executable to:
receive a request to lookup a given key in the hash table;
generate a first lookup hash value by applying a first hash function to the key of the key-value pair;
identify a first bucket within the hash table that corresponds to the first lookup hash value; and
in response to determining the first bucket within the hash table that corresponds to the first lookup hash value has a slot that stores a key matching the given key, return a value stored in the table that is associated with the key matching the request.

20. The non-transitory computer readable storage medium as recited in claim 19, wherein in response to determining the first bucket within the hash table that corresponds to the first lookup hash value does not have a slot that stores a key matching the given key, the program instructions are executable to determine whether the first bucket within the hash table that corresponds to the first lookup hash value includes remap entries.

* * * * *